United States Patent
Abe et al.

(10) Patent No.: US 6,356,298 B1
(45) Date of Patent: Mar. 12, 2002

(54) THREE-DIMENSIONAL IMAGE PHOTOGRAPHING SYSTEM

(75) Inventors: Tsutomu Abe; Hiroki Kato, both of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/366,326

(22) Filed: Aug. 2, 1999

(30) Foreign Application Priority Data

Aug. 18, 1998 (JP) .......................................... 10-247796

(51) Int. Cl.[7] .............................................. H04N 13/02
(52) U.S. Cl. ........................................................ 348/47
(58) Field of Search ............................. 348/47, 48, 49, 348/61, 139, 62, 136, 50, 51, 63, 81; 382/152, 153, 154, 140, 141; 356/374, 376; H04N 13/02

(56) References Cited

FOREIGN PATENT DOCUMENTS

| JP | A-3-192474 | 8/1991 |
| JP | A-5-332737 | 12/1993 |
| JP | B2-2565885 | 10/1996 |

*Primary Examiner*—Chris Kelley
*Assistant Examiner*—Tung Vo
(74) *Attorney, Agent, or Firm*—Oliff & Berridge, PLC (57) ABSTRACT

A three-dimensional photographing system is disclosed which can photograph a three-dimensional image with high accuracy without dependence on an object. The photographing system is provided with a projector for projecting a coded pattern, a third camera for photographing the projected pattern in an optical axis direction of the projector, and a first and a second cameras for photographing the projected pattern in a direction different from the optical axis direction of the projector. It is determined by a region dividing unit whether the amount of change of the photographed pattern obtained by the third camera relative to the projected pattern is not smaller than a predetermined value, and a new code is allocated by a recoding unit to a region where the amount of change is not smaller than the predetermined value. In decoding units, using this allocated code, distance information is generated from the photographed patterns obtained by the first and second cameras, and a three-dimensional image is obtained in a distance information integrating unit in accordance with the distance information and luminance information obtained by the third camera.

7 Claims, 7 Drawing Sheets

THREE-DIMENSIONAL IMAGE PHOTOGRAPHING SYSTEM

BACKGROUND OF THE INVENTION

1. Field of the Invention

The present invention relates to a three-dimensional image photographing system for generating three-dimensional image information from luminance information and distance information.

2. Description of the Related Art

Heretofore, as methods for measuring the shape of an object there have been known a passive method (shape from X, stereo view) and an active method (laser radar, pattern projection, spot projection). The passive method is a general-purpose method and is characteristic in that there are few restrictions on an object, while the active method is characteristic in that the measurement accuracy is generally high, but that the measurable range is small due to, for example, a limit encountered in an employable projector part.

In a pattern projection method, which is an active method, pattern light as reference light is projected to an object and a projected pattern is photographed in a direction different from the pattern light projected direction. The photographed pattern is deformed in conformity with the shape of the object. Three-dimensional measurement of the object can be done by correlating the photographed deformed pattern with the projected pattern.

Such correlation between the deformed pattern and the projected pattern should be done in a simple manner while minimizing the occurrence of error. This is a subject to be attained in the pattern projection method. In an effort to achieve this subject, various methods for pattern projection have been proposed (e.g. space pattern coding, moire, color coding). For example, in Japanese Published Unexamined Patent Application No. Hei 5-332737 is disclosed a shape measuring system of a small size and a simple structure, which uses a space coding method. The system disclosed therein comprises a laser beam source, a lens system for shaping the laser beam into a slit shape, a scanner which radiates the shaped laser beam to an object and scans the object, a CCD camera which detects reflected light from the object, and a controller for controlling those components. When the object is scanned with the laser beam with use of the scanner, there occur a portion radiated with the laser beam and a portion not radiated with the same beam. If the radiation of the laser beam is performed in accordance with a plurality of different patterns, the object will be divided into N number of distinguishable portions. By checking in which divided portions the pixels on images are contained, the shape of the object can be determined by calculation, which images are obtained by photographing the object at different positions with use of CCD cameras. In this case, for enhancing the resolution, scanning with laser beam and photographing with cameras are needed each plural times. For example, for dividing the screen into 256 regions, it is required to perform photographing eight times. Consequently, photographing is difficult for an object in quick motion. In addition, while scanning is performed, it is necessary to fix the photographing system firmly. Thus, it is difficult to effect easy photographing although the system itself may become simplified in structure.

For example, as a method for reducing the number of pattern projection, a color coding method is disclosed in Japanese Published Unexamined Patent Application No. Hei 3-192474. In the color coding method, q and k are each assumed to be a predetermined natural number of 2 or more, and using q or more number of colors, there is projected a coded pattern so that two adjacent light slits are not of the same color and so that the arrangement of colors based on k number of adjacent light slits appears only once, then slit colors are detected from an observed image and slit numbers are obtained. Then, an irradiation direction in each slit is calculated from the slit numbers, whereby distance can be calculated in the same way as in the space coding method. The color coding method involves the problem that the amount of calculation for code restoration is large because the code restoration is made from the arrangement of code row. For example, when division is to be made into 256 regions using three colors of red, green and blue, it is necessary to know the arrangement of eight slit lights around slits. Thus, this method is suitable for only the measurement of an object whose shape permits continuous and long slit observation.

As a method which facilitates the restoration of slits and which projects a coded pattern by a single operation, there is known such a space pattern coding method as is proposed in Japanese Patent Publication No. 2565885. According to this method, there are provided three or more kinds of gradation areas using light and shade of a ternary value or more, or three or more colors, or a combination of light and shade with color. Also provided is a multi-valued lattice plate pattern disposed so that at least three kinds of gradation areas contact one another at an intersecting point of boundary lines of the gradation areas, and a main code, which conforms to the kind and order of gradations, is applied to an intersecting point of projected images resulting from projection of the pattern to an object. This main code, or a combined code obtained by combining the main code with a main code at a surrounding intersecting point, is used as a feature code for identification of the previous intersecting point.

In the conventional methods, however, a certain object to be photographed causes the collapse of coding, making it impossible to effect correlation of correct codes. For example, when a row of patterns projected by a light source is photographed with a camera, drop-out or inversion may occur in the photographed pattern row. A certain shape or reflectance of an object may also cause a change in both the projected pattern row and photographed pattern row, making correlation difficult.

In the color coding method, this problem is avoided by omission of decoding with respect to patterns which are likely to cause drop-out or inversion of slits. In the space pattern coding method, a two-dimensional pattern is used to diminish the aforesaid possibility of error, but a certain object gives rise to the same error basically. Thus, according to the conventional methods, under general photographing conditions not making any limitation on an object, the deterioration of accuracy is unavoidable, although high accuracy is obtained in special conditions set within a laboratory or under a limited condition of an object.

According to the method using a light source to effect projection, when an object having a wide range is to be photographed, a three-dimensional shape will not be obtained with respect to a portion incapable of being covered by a projected pattern. Also as to a shade area formed when a projected pattern is shut out by an object, a three-dimensional shape is not obtained because it is impossible to make the measurement of distance.

SUMMARY OF THE INVENTION

Accordingly, it is an object of the present invention to provide a three-dimensional image photographing system capable of photographing a three-dimensional image with high accuracy without dependence on an object.

It is another object of the present invention to provide a three-dimensional image photographing system capable of obtaining both luminance information and distance information simultaneously.

The above objects are achieved by a three-dimensional image photographing system comprising a projector for projecting a coded pattern, a first camera for photographing the projected pattern in an optical axis direction of the projector, and a second camera for photographing the projected pattern in a direction different from the optical axis direction of the projector, wherein a new code is allocated to a region where the amount of change of the photographed pattern obtained by the first camera relative to the projected pattern is not smaller than a predetermined value, then using the allocated code, first distance information is generated from the photographed pattern obtained by the second camera, and a three-dimensional image is obtained on the basis of the first distance information and luminance information obtained by the first camera.

As to a region where the amount of change of the photographed pattern obtained by the first camera relative to the projected pattern is smaller than the predetermined value, second distance information can be generated by correlating the luminance information obtained by the first camera and luminance information obtained by the second camera with each other. The second distance information is used for generating the above three-dimensional image. The second camera may be composed of a third and a fourth cameras disposed on both sides of the first camera in the same plane.

The foregoing other object of the present invention is achieved by using as a projector a light source which generates light of the invisible region. In this case, the first camera is provided with a light dividing unit for dividing incident light, a first photographing unit for photographing divided light through an invisible region pass filter, and a second photographing unit for photographing divided light through an invisible region cut-off filter. Without using such a light source, there may be adopted a construction wherein the projection of pattern from the projector is performed every other frame and both photographing of a pattern and acquisition of luminance information are performed alternately frame by frame by the first camera.

A three-dimensional image photographing method according to the present invention comprises projecting a coded pattern, photographing the projected pattern in the same optical axis direction as in the pattern projection and also in a different optical axis direction, allocating a new code to a region where the amount of change of the photographed pattern obtained by photographing in the aforesaid same optical axis direction relative to the projected pattern is not smaller than a predetermined value, then using this allocated code, generating distance information from the photographed pattern obtained by photographing in the different optical axis direction, and forming a three-dimensional image in accordance with the distance information and luminance information obtained by photographing in the same optical axis direction.

According to the present invention constructed as above it is possible to provide a three-dimensional image photographing system capable of photographing a three-dimensional image with high accuracy without dependence on an object and it becomes possible to obtain both luminance information and distance information simultaneously.

DESCRIPTION OF THE PREFERRED EMBODIMENT

An embodiment of the present invention will be described hereunder with reference to the accompanying drawings.

Figure 1:
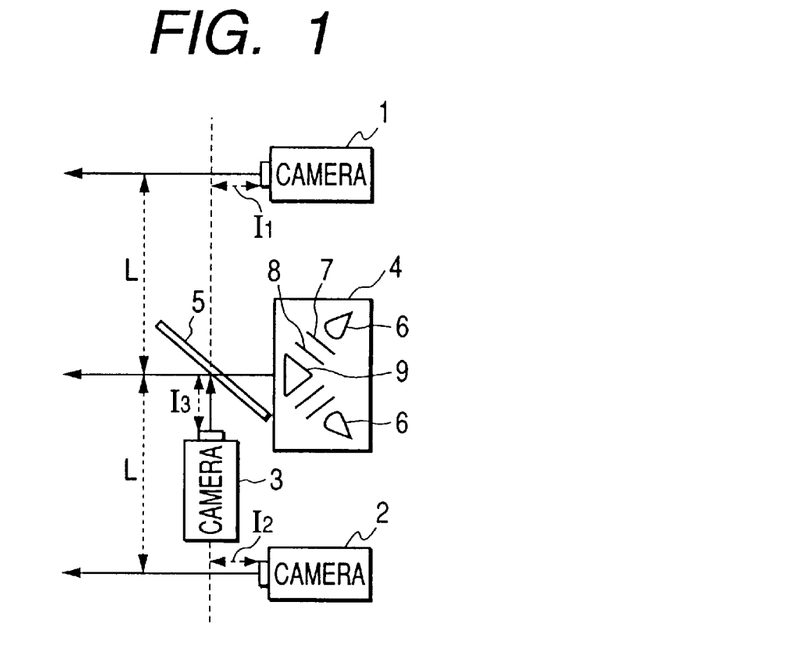
FIG. 1 is a diagram showing a relation of arrangement between cameras and a projector which are used in a three-dimensional image photographing system embodying the present invention.

FIG. 1 is a diagram showing a relation of arrangement between cameras and a projector which are used in a three-dimensional photographing system embodying the present invention. As shown in the same figure, the three-dimensional image photographing system is provided with three cameras 1 to 3 and a projector 4. In order for the cameras to be in a relation of equal distance, distances $l_1$, $l_2$ and $l_3$ shown in the figure are set equal to one another. The camera 3 and the projector 4 are arranged for coincidence in optical axis with use of a half mirror 5, while the cameras 1 and 2 are arranged on both sides of the camera 3 and the projector 4 so as to be different in optical axis from them. The distance between the central optical axis and each of both-side optical axes is a base length L.

Figure 2:
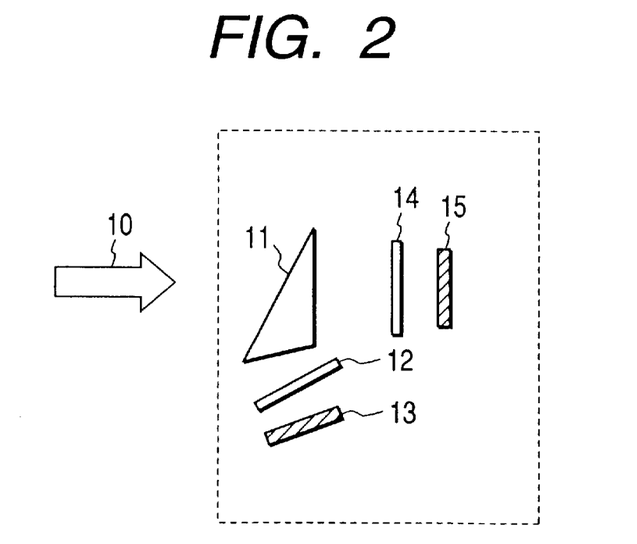
FIG. 2 is a diagram showing a construction example of a camera.

The projector 4 comprises a light source 6, a mask pattern 7, an intensity pattern 8 and a prism 9. As the light source 6, there may be adopted a light source of the invisible region using infrared or ultraviolet light. In this case, each camera is constituted as in FIG. 2. As illustrated therein, incident light 10 is divided in two directions by means of a prism 11 and one of the divided light portions passes through an invisible region (infrared or ultraviolet) pass filter 12 and enters an image pick-up device (say, a CCD camera) 13, while the other passes through an invisible region (infrared and ultraviolet) cut-off filter 14 and enters an image pick-up device 15. The light source 6 is not limited to be of the visible or invisible region. There may be used any light source of a wavelength band capable of image pick-up. In this case, a progressive scan type CCD camera is used as the camera 3, while the cameras 1 and 2 are not specially limited with respect to their constructions. But, taking the association with the camera 3 into account, it is desirable to use a CCD camera of the same construction as that of the camera 3. A pattern is projected from the light source 6 and is photographed by the three cameras 1 to 3 simultaneously. In each camera, the light which has passed through the filters 12 and 14 is picked up by the image pick-up devices 13 and 15, respectively, whereby images are obtained at a time.

Figure 3:
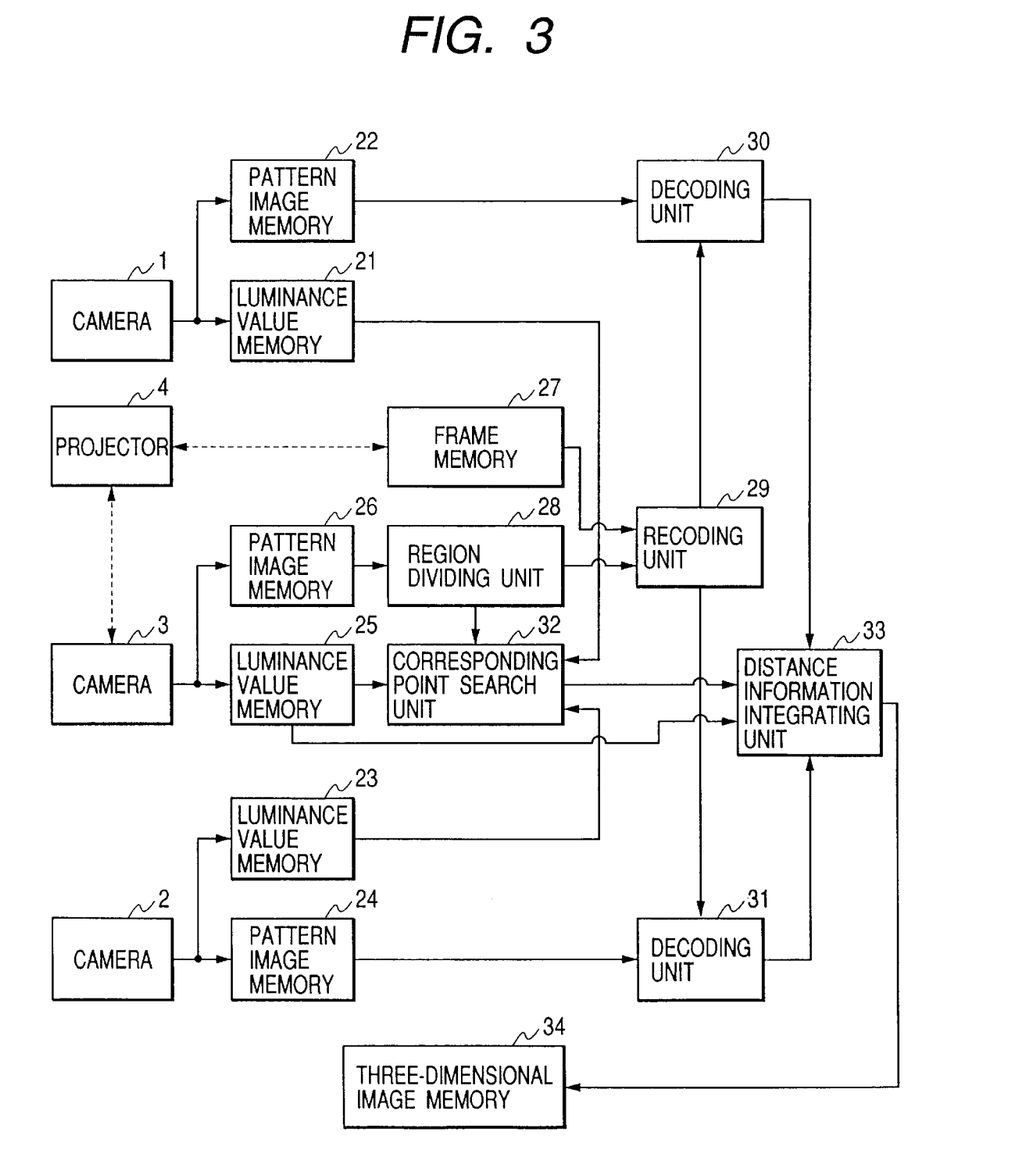
FIG. 3 is a block diagram of the three-dimensional image photographing system embodying the present invention.

As shown in FIG. 3, which is a block diagram of the three-dimensional image photographing system, the camera 1 stores luminance information obtained by photographing into a luminance value memory 21 and stores a photographed pattern into a pattern image memory 22. Likewise, the camera 2 stores luminance information into a luminance value memory 23 and stores a photographed pattern into a pattern image memory 24. The camera 3 stores luminance information into a luminance value memory 25 and also stores a photographed pattern into a pattern image memory 26. For later reference to a coded pattern prepared in advance, the projector 4 divides each slit into cells on a square lattice and stores them in a frame memory 27.

Using these photographed patterns and luminance information pieces thus stored and held, a three-dimensional image is obtained in the following manner. Since the following operations are common to both combination of cameras 1 and 3 and combination of cameras 2 and 3, a description will be directed below to only the combination of cameras 1 and 3 as an example.

In FIG. 3, a region dividing unit 28 divides the pattern photographed by the camera 3 into regions and as to a region where the difference in intensity between adjacent slit patterns is not larger than a threshold value, the region dividing unit 28 regards the region as region 1 with the light from the projector not reached yet and extracts the region 1, while as to a region where the difference in intensity between slit patterns is not smaller than the threshold value, the region dividing unit 28 extracts the region as region 2. For the extracted region 2, a recoding unit 29 performs recoding, using the photographed pattern stored in the pattern image memory 26 and the projected pattern stored in the frame memory 27.

Figure 4:
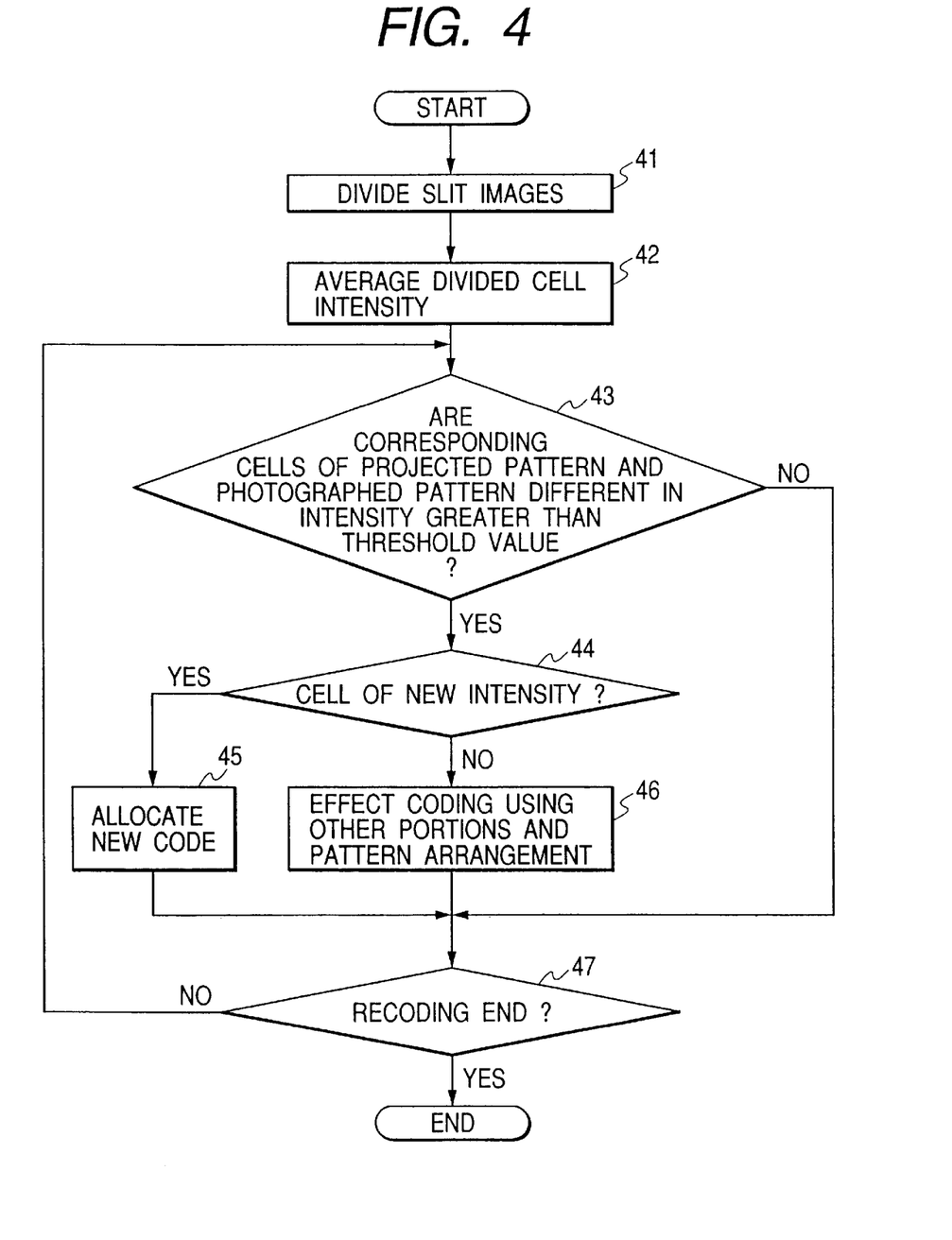
FIG. 4 is a flowchart showing a recoding process.

FIG. 4 is a flowchart showing a recoding process. First, each slit pattern is divided in the vertical direction for each slit width (step 41) to form square cells. Then, a mean value in strength is obtained for each cell thus formed and is regarded as the intensity of the cell (step 42). Cells corresponding to a projected pattern and a photographed pattern are compared in intensity from each other successively from the center of the image concerned, and determination is made as to whether the differences between the intensities of the cells are greater than a threshold value due to a change of the patterns caused by such factors as the reflectance of an object and the distance to the object (step 43). If the answer is negative, recoding is ended for all of the photographed cells (step 47), while if the answer in step 43 is affirmative, it is determined whether a cell of a new intensity is present, and if the answer is affirmative, a new code is generated and allocated (step 45), while if the answer is negative, coding is performed using the arrangement of slit patterns distinguishable from other appearing portions (step 46). Recoding is now completed (step 47).

Figure 5A:
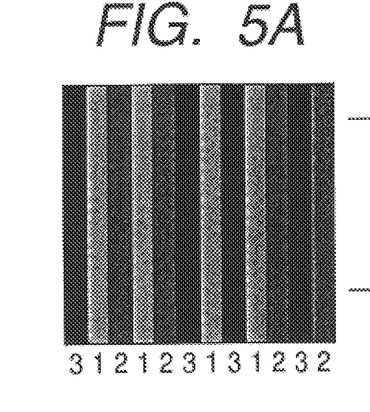
FIGS. 5A to 5C are diagrams showing examples of coding of slit patterns.
Figure 5B:
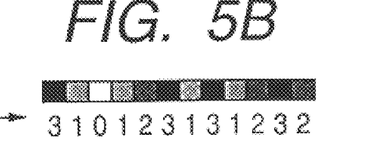
Figure 5C:
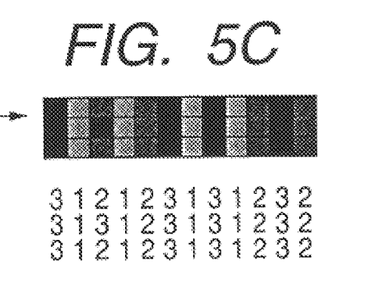

FIG. 5 shows examples of coding of slit patterns, in which A shows a projected pattern coded by the arrangement of slits, with three intensities being allocated like 3 (strong), 2 (medium) and 1 (weak). In FIG. 5B, a new code appeared as a result of a change in intensity of the third cell from the left side, to which a code "0" is newly allocated. In FIG. 5C, there appears an existing code in the cell positioned third from the left side and second from the top, so recoding is performed for the arrangement of cells like [232] and [131] as vertical and lateral arrangements, respectively. This recoding corresponds to the projection of a complicated pattern such as a two-dimensional pattern to a portion of the object where the shape of the object is full of variety and the projection of a simple pattern to a portion of the object where there is little change in the shape of the object. Recoding is effected by repeating this process and by allocating unique codes to all of the cells.

Figure 6:
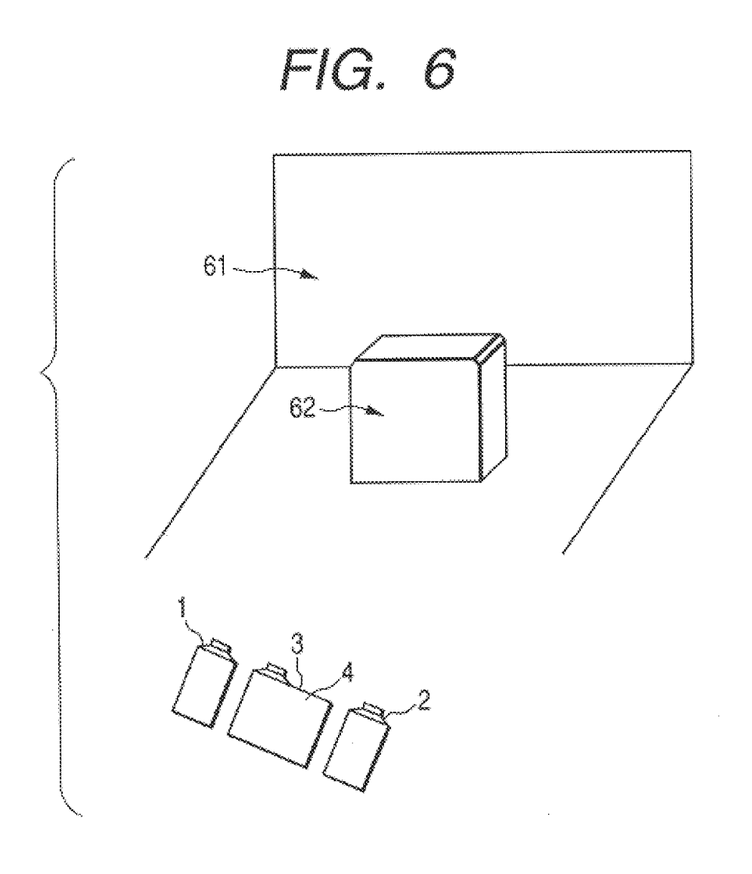
FIG. 6 is a diagram showing an example of projection and photographing of a coded pattern with use of cameras and a projector.
Figure 7:
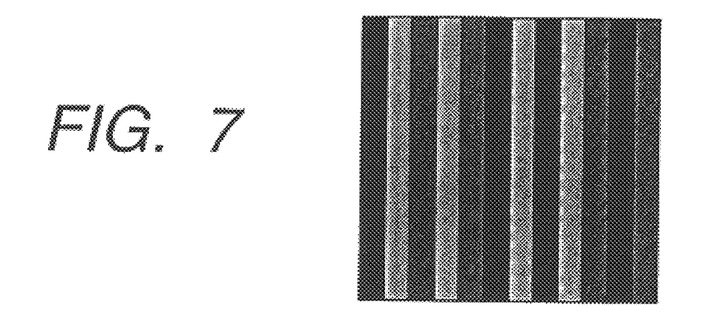
FIG. 7 is a diagram showing an example of a coded pattern for projection.
Figure 8:
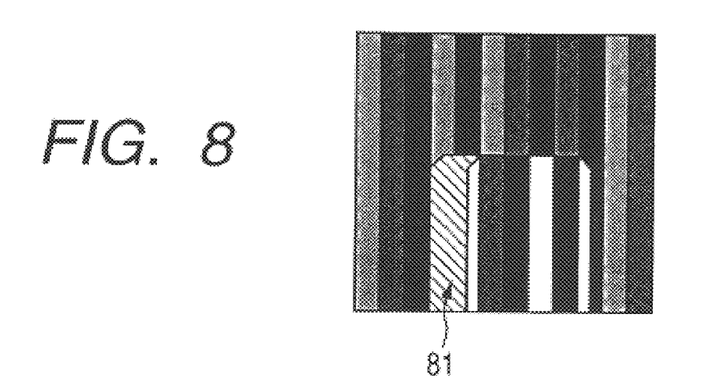
FIG. 8 is a diagram showing an example of a slit pattern photographed by a camera 1.
Figure 9:
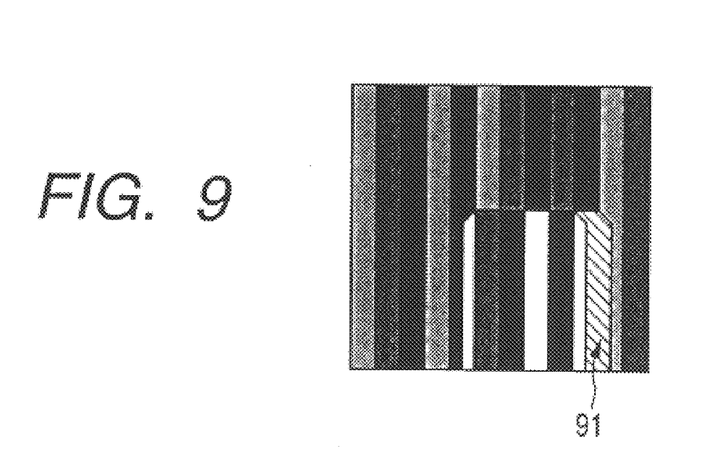
FIG. 9 is a diagram showing an example of a slit pattern photographed by a camera 2.
Figure 10:
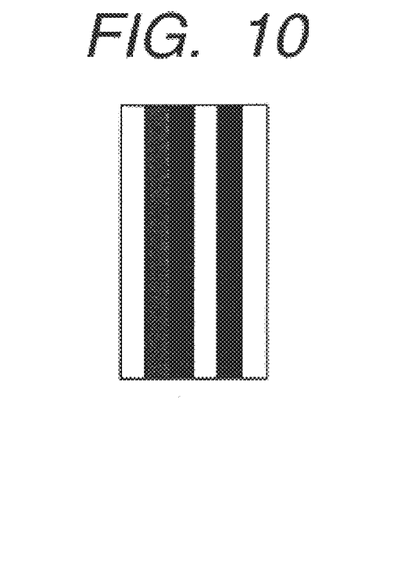
FIG. 10 is a diagram showing an example of a newly coded slit pattern.

FIG. 6 shows an example of projecting a coded pattern onto a plate 62 disposed in front of a wall 61, using the cameras 1 to 3 and the projector 4, which coded pattern corresponds to the slit pattern shown in FIG. 7. In this case, images obtained by the cameras 1 and 2 involve regions 81 and 91 shaded by the plate 62, as shown in FIGS. 8 and 9. In this example, as a newly coded pattern, such a slit pattern as shown in FIG. 10 is obtained on the surface of the plate 62.

Figure 11:
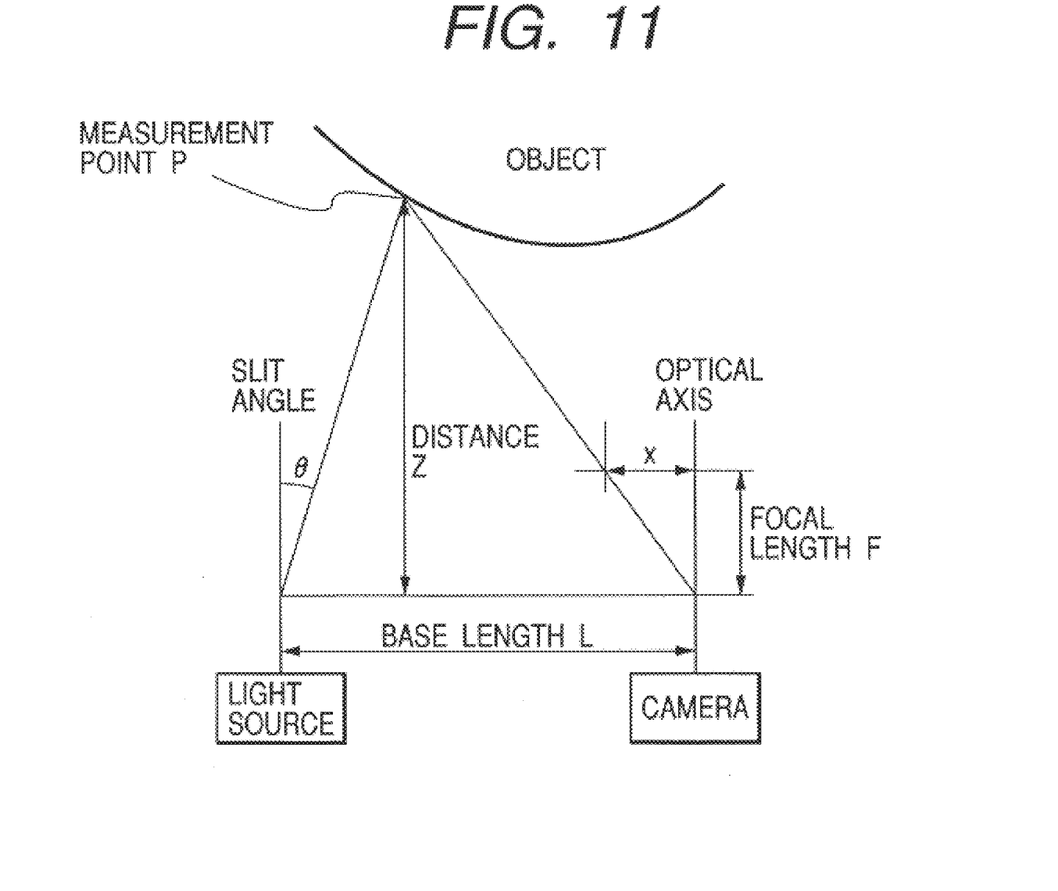
FIG. 11 is a diagram showing a distance calculating method in space coding.

Turning back to FIG. 3, a decoding unit 30 on the side of the camera 1 extracts a projected pattern from the pattern image memory 22 and divides it into cells in the same manner as above. Then, using the code obtained previously by recoding in the recoding unit 29, the decoding unit 30 detects the code of each cell and calculates a slit angle θ from the light source in accordance with the detected code. FIG. 11 is a diagram showing a distance calculating method in space coding. Distance Z is calculated by the following Equation 1, using the slit angle θ of each cell to which each pixel belongs, x coordinates on an image photographed with the camera 1, and focal length F and base length L as camera parameters:

$$Z=(F\times L)/(x+F\times\tan\theta) \quad \text{Equation 1}$$

This calculation of the distance Z is performed in the same way also in the decoding unit 31 on the side of the camera 2.

As to the foregoing region 1, a distance is calculated in the following manner. In the region 1, a pattern detection using a projected pattern cannot be effected, so in a corresponding point search unit 32, a parallax is detected using luminance information pieces read from the luminance value memories 21, 23 and 25 for the cameras 1 to 3 and a distance is calculated on the basis of the parallax. As to the other region than the region 1, a distance has already been calculated in the aforesaid manner, so there is obtained a minimum value of distance in the region 1, and pixels capable of correlation are also limited. Using these limitations, there is performed a pixel-to-pixel correlation and a parallax, d, is detected. Then, using a pixel size, λ, as a camera parameter, the distance Z is calculated from the following Equation 2:

$$Z=(L\times F)/(\lambda\times d) \quad \text{Equation 2}$$

Figure 12:
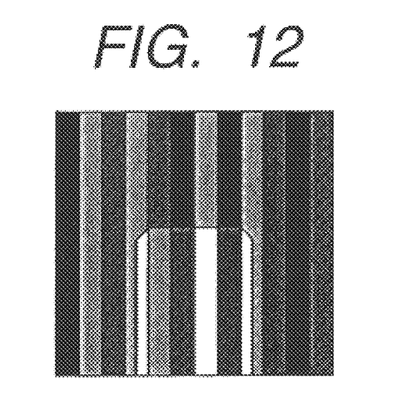
FIG. 12 is a diagram showing an example of a slit pattern photographed by a camera 3.

The distance information obtained by the combination of cameras 3 and 1 in the foregoing manner does not permit detection of distance information in the region 81 shaded by the plate shown in FIG. 8. On the other hand, the distance information obtained by the combination of cameras 3 and 2 does not permit detection of distance information in the region 91 shaded by the plate shown in FIG. 9. However, the shaded portions correspond to regions incapable of being taken in as luminance information in the camera 3, like the pattern shown in FIG. 12. Therefore, disregarding the shaded portions, the distance information calculated from the combination of cameras 3 and 1, the distance information calculated from the combination of cameras 3 and 2, and the distance information calculated from the luminance information pieces in the cameras 1 to 3, are integrated with the luminance information obtained by the camera 3, to afford a three-dimensional image information. By storing the three-dimensional image information thus obtained into a three-dimensional image memory 34, there is effected three-dimensional image photographing.

Figure 13A:
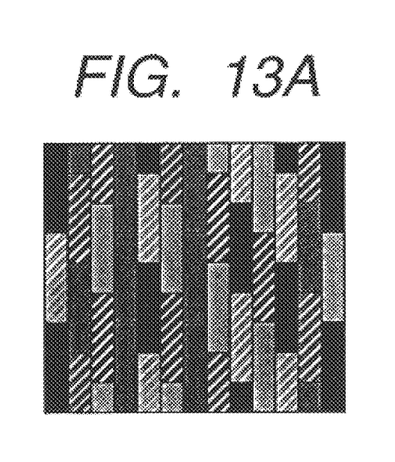
FIG. 13A is a diagram showing an example of a projected pattern using light of different wavelengths and FIGS. 13B and 13C are diagrams showing mask patterns thereof.
Figure 13B:
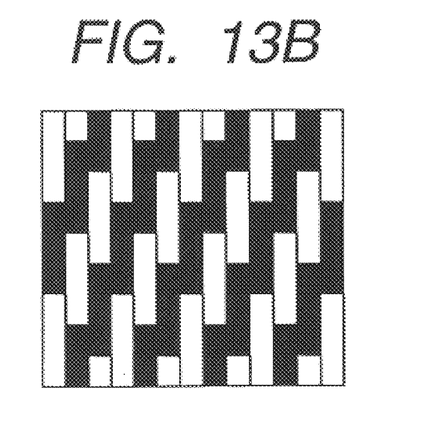
Figure 13C:
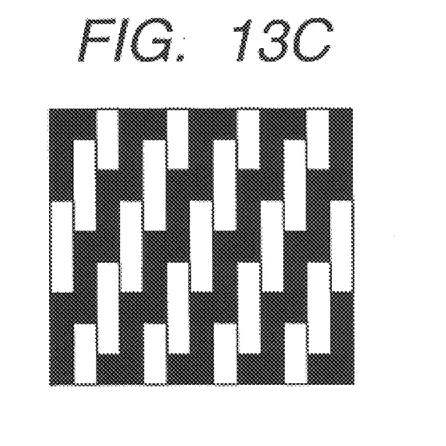

The present invention is not limited to the above embodiment. Although in the above embodiment an infrared or ultraviolet light source is used as the light source, there may be used a light source of any other wavelength. Also as to the coding of patterns, it can be effected not only by utilizing the difference in intensity but also by utilizing the difference between two wavelengths. For example, using light of two different wavelengths, it is possible to effect coding as in FIG. 13A, in which hatched portions and unhatched portions are different in wavelength. For the projection of such a pattern there are used such mask patterns as shown in FIGS. 13B and 13C. By coding a projection pattern with use of two wavelengths it becomes easier to effect identification than in the coding of pattern using intensity. In addition, there decreases the possibility of a certain pattern portion changing into the same pattern as the other pattern portion, depending on the reflectance and shape of an object. As a result, the occurrence of erroneous recognition decreases and so does the amount of calculation required for recoding.

For using a light source of the visible region, blinking of a projected pattern and read of the camera 3 must be improved. In a conventional CCD camera there is adopted an interlace scan method, in which one frame is divided into two fields for scanning. On the other hand, a progressive scan method adopts a one-frame one-field scan, thus reducing the read time in one frame by half. In the case of projecting a pattern with use of a light source of the visible region, it is impossible to take correlation with a luminance image, so the projected pattern is allowed to blink and photographed every other frame, using a progressive scan type CCD camera. A luminance image is obtained in a certain frame and a projected pattern is photographed in the next frame, thus affording both luminance information and distance information in two frames. Two frames are used as one cycle for image pick-up, but the scan time is substantially the same as in the interlace scan method. Also as to the cameras 1 and 2, both distance information and luminance information which is for the search of a corresponding point can be obtained in the same manner.

According to the present invention, by recoding a projected pattern with use of a pattern which has been photographed at the same optical axis as that of the projected pattern, it is possible to effect a three-dimensional shape measurement with a high accuracy. This recoding process makes it possible to obtain an effect equal to changing the pattern light in conformity with the shape of an object. By appropriate arrangement and combination of cameras it is possible to eliminate occlusion which comes into question in the pattern projection method. By adopting the projection using invisible light and by making some improvement on the pattern projecting method and read timing in the image pickup device, it is possible to obtain both distance information and luminance information at a time. Thus, without depending on the shape of an object or photographing conditions, it is possible to effect a three-dimensional distance measurement with no occlusion found in the screen that serves as a finder.

According to the present invention, as set forth above, it is possible to afford three-dimensional image photographing system capable of photographing a three-dimensional image with high accuracy without dependence on an object. In addition, both luminance information and distance information can be obtained at a time.

What is claimed is:
1. A three-dimensional image photographing system comprising:
   a projector for projecting a coded pattern in an optical axis;
   a first camera for photographing said projected pattern in an optical axis that is the same as the optical axis of said projector; and
   a second camera for photographing said projected pattern in an optical axis that is different from the optical axis of said projector,
   wherein a new code is allocated to a region where the amount of change of the photographed pattern obtained by said first camera relative to said projected pattern is not smaller than a predetermined value, then using said allocated code, first distance information is generated from the photographed pattern obtained by said second camera, and a three-dimensional image is obtained on the basis of said first distance information and luminance information obtained by said first camera.

2. A three-dimensional image photographing system according to claim 1, wherein as to a region where the amount of change of the photographed pattern obtained by said first camera relative to said projected pattern is smaller than the predetermined value, second distance information is generated by correlating the luminance information obtained by said first camera and luminance information obtained by said second camera with each other, and a three-dimensional image is formed using said first distance information, said second distance information and the luminance information obtained by said first camera.

3. A three-dimensional image photographing system according to claim 1, wherein said projector has a light source which generates light of the invisible region, and said first camera has a filter which allows light of the invisible region to pass therethrough and also has a filter which cuts off light of the invisible region.

4. A three-dimensional image photographing system according to claim 1, wherein said projector performs the projection of the coded pattern every other frame, and said first camera performs the photographing of the projected pattern and the acquisition of the luminance information alternately frame by frame.

5. A three-dimensional image photographing system according to claim 1, wherein said second camera comprises a third camera and a fourth camera which are disposed on both sides of said first camera in the same plane.

6. A three-dimensional image photographing method comprising:

projecting a coded pattern with a projector in an optical axis;

photographing said projected pattern in an optical axis that is the same as the optical axis of said projector and also in an optical axis that is different from said optical axis of said projector;

allocating a new code to a region where the amount of change of the photographed pattern obtained by photographing in said same optical axis direction relative to said projected pattern is not smaller than a predetermined value;

then, using the allocated code, generating distance information from the photographed pattern obtained by photographing in said different optical axis direction; and forming a three-dimensional image in accordance with said distance information and luminance information obtained by photographing in said same optical axis direction.

7. The three-dimensional image photographing system of claim 1, wherein said first camera comprises:

an incident light dividing unit;

a first photographing unit for photographing divided light obtained by said incident light dividing unit through an invisible region pass filter; and a second photographing unit for photographing divided light obtained by said incident light dividing unit through an invisible region cut-off filter.

* * * * *